United States Patent
Wildmann et al.

(10) Patent No.: US 7,034,247 B2
(45) Date of Patent: Apr. 25, 2006

(54) APPARATUS FOR HANDLING SHEET METAL WORKPIECES TO BE WELDED

(75) Inventors: Daniel Wildmann, Niederweningen (CH); Hans Aebersold, Birmensdorf (CH); Martin van der Schaar, Seuzach (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 10/674,095

(22) Filed: Sep. 26, 2003

(65) Prior Publication Data

US 2005/0072829 A1    Apr. 7, 2005

Related U.S. Application Data

(62) Division of application No. 09/831,483, filed as application No. PCT/CH99/00518 on Nov. 4, 1999, now Pat. No. 6,713,712.

(30) Foreign Application Priority Data

Nov. 18, 1998    (CH) ...................................... 2308/98

(51) Int. Cl.
    *B23K 26/00*    (2006.01)
(52) U.S. Cl. .............................. 219/121.63; 219/121.64
(58) Field of Classification Search .......... 219/121.63, 219/121.65, 121.73, 121.64, 121.66; 228/164, 228/173.2
    See application file for complete search history.

(56) References Cited

U.S. PATENT DOCUMENTS

| | | | | |
|---|---|---|---|---|
| 5,074,457 A | * | 12/1991 | Matsuki et al. | 228/158 |
| 5,205,468 A | * | 4/1993 | Budenbender | 228/164 |
| 5,217,155 A | * | 6/1993 | Kitahama et al. | 228/173.3 |
| 5,290,990 A | * | 3/1994 | Bischofberger et al. | 219/82 |
| 5,603,853 A | * | 2/1997 | Mombo-Caristan | 219/121.64 |

FOREIGN PATENT DOCUMENTS

| | | |
|---|---|---|
| DE | 196 23 664 C1 | 6/1996 |
| EP | 0 565 846 A1 | 3/1993 |
| WO | PCT/EP84/00030 | 7/1984 |

* cited by examiner

*Primary Examiner*—M. Alexandra Elve
(74) *Attorney, Agent, or Firm*—McCormick, Paulding & Huber LLP

(57) ABSTRACT

An apparatus for handling a pair of sheet metal workpieces to be welded is provided that includes a first workpiece holder, a second workpiece holder, at least one backing element, and at least one squeeze roller. The first and second workpiece holders are positioned so that an edge of one of the pair of sheet metal workpieces is in contact with, or separated a gap from, an edge of the other sheetmetal workpiece. The backing element is disposed on a first side of the sheet metal workpieces, and the squeeze roller is disposed on a second side of the sheetmetal workpieces opposite the first side. The squeeze roller is substantially aligned with the backing element. The squeeze roller is formed as a body symmetrical in rotation. Force selectively applied to the squeeze roller will cause plastic deformation of one of the pair of sheet metal workpieces and thereby cause the deformed sheet metal workpiece to extend into the gap.

6 Claims, 2 Drawing Sheets

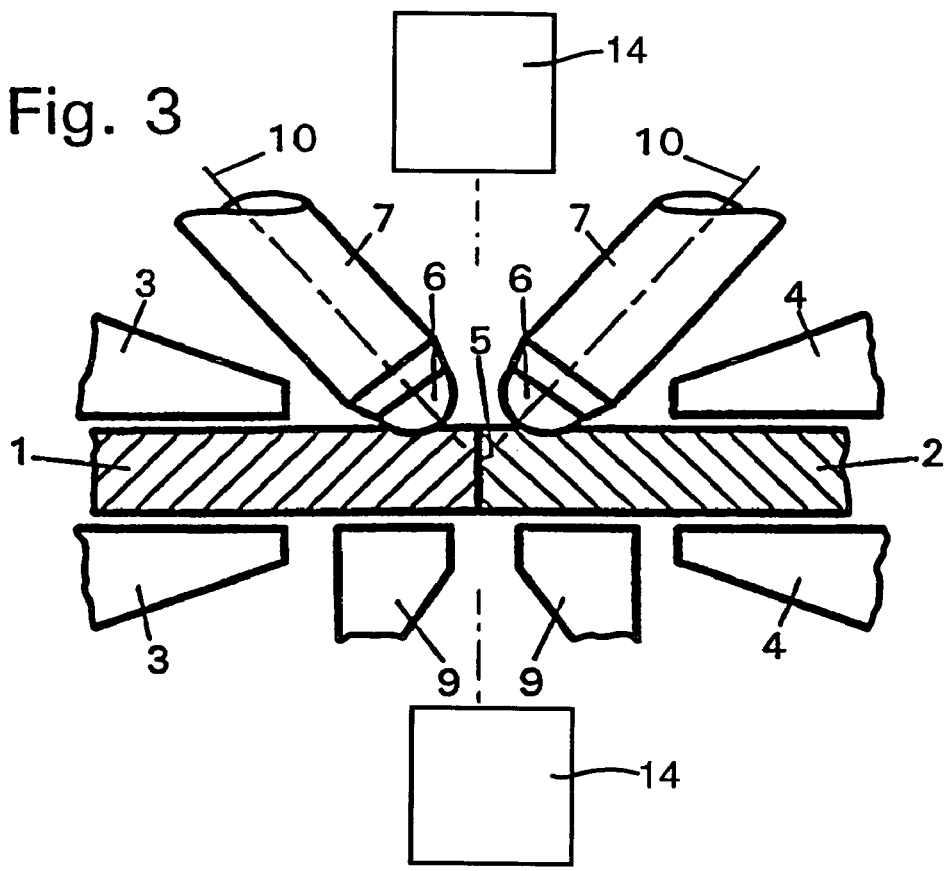
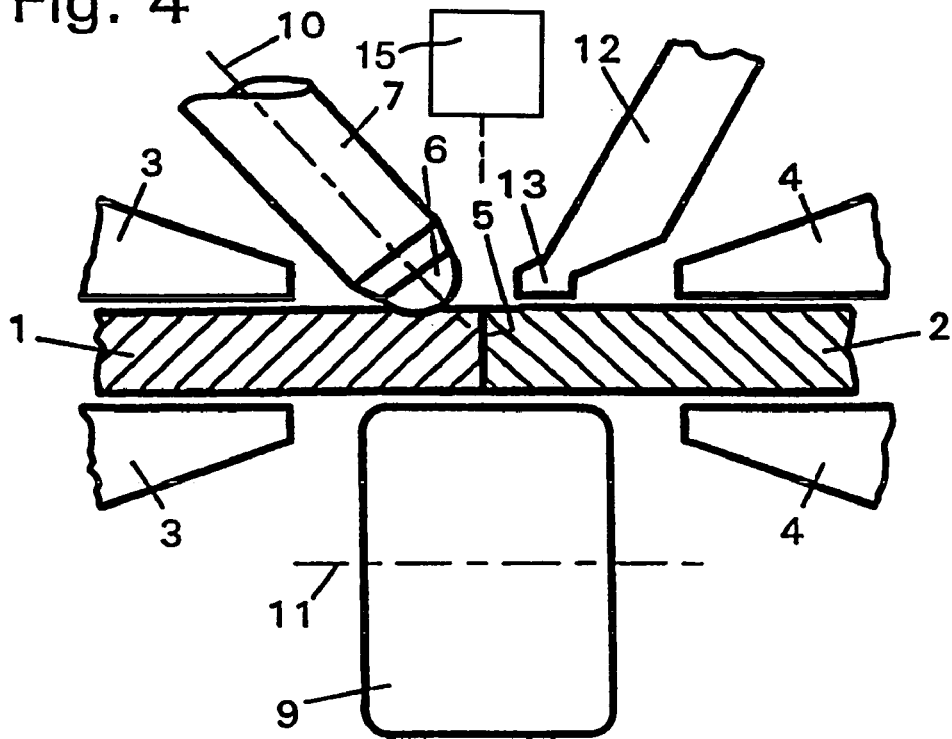

APPARATUS FOR HANDLING SHEET METAL WORKPIECES TO BE WELDED

CROSS REFERENCE TO RELATED APPLICATIONS

This application is a divisional of U.S. application Ser. No. 09/831,483, filed May 9, 2001, now U.S. Pat. No. 6,713,712 which claims priority to International Application No. PCT/CH99/00518, filed Nov. 4, 1999, which in turn claims priority to Swiss Patent Application No. 2308/98, filed Nov. 18, 1998.

BACKGROUND OF THE INVENTION

1. Technical Field

The present invention relates to methods and apparatus for welding metal sheets in general, and to methods and apparatus for controlling the gap between the metal sheets being welded in particular.

2. Background Information

Laser welding is now in widespread use as a process for joining metal sheets together. In this process the sheets are preferably butt jointed, with their edges positioned so that there is only a narrow gap between the sheets. To obtain a weld seam of high quality, the gap between the sheets to be joined should not be wider than 0.05 or 0.08 mm, and the deviations of each individual sheet should not exceed one half of these maximum permissible widths of gap. It is obvious that in order to observe such tolerances, correspondingly expensive tools, or complicated machining methods, are necessary.

It is known from European Patent Application No. EP 0565846 when welding straight seams to plastically deform at least one of the metal sheets with a squeeze roller before or in the welding zone so that the maximum permissible width of gap between the sheets to be joined is not exceeded. In connection with this known teaching, a series of embodiments are described which relate in particular to the varied configuration of the squeeze rollers.

The known teaching is only suitable for straight weld seams. In particular it is unsuitable if there is a requirement to guide the weld seams along a given line, as in such cases the squeeze rollers proposed in the known teaching generate lateral forces which can lead to undesired distortions of the metal sheets.

DISCLOSURE OF THE INVENTION

It is, therefore, an object of the present invention to provide a method and an apparatus for welding metal sheets that can weld a seam along any given line.

According to the present invention, an apparatus for handling a pair of sheet metal workpieces to be welded is provided that includes a first workpiece holder, a second workpiece holder, at least one backing element, and at least one squeeze roller. The first and second workpiece holders are positioned so that an edge of one of the pair of sheet metal workpieces is in contact with, or separated a gap from, an edge of the other sheetmetal workpiece. The backing element is disposed on a first side of the sheet metal workpieces, and the squeeze roller is disposed on a second side of the sheetmetal workpieces opposite the first side. The squeeze roller is substantially aligned with the backing element. The squeeze roller is formed as a body symmetrical in rotation. Force selectively applied to the squeeze roller will cause plastic deformation of one of the pair of sheet metal workpieces and thereby cause the deformed sheet metal workpiece to extend into the gap.

The invention has the following advantages: Since a squeeze roller is used which obtains a plastic deformation that is independent of the squeeze roller's direction of advance on the metal sheet concerned, the weld seam can be guided along any given line without risking insufficient deformation of the sheets to be welded. The method according to the invention and the apparatus for carrying out the method can therefore be used for welding sheets of any desired shape.

When, in a continuation of the invention, the squeeze roller consists of a ball, it moreover becomes possible to obtain an apparatus according to the invention that is extremely compact, as the radius of the ball is greatly reduced in comparison with the outer dimensions of the known squeeze rollers, which means that the force acting on the squeezer ball to yield a given effect can also be reduced.

Lastly, by forming the squeeze roller according to the invention as a ball, it is possible to set the mounting (or "support") of the squeeze roller at an oblique angle to the plane formed by the sheets to be welded. This leaves the joint line between the sheets freely accessible, so that detection devices can be used to detect the actual width of gap between the sheets in the squeezing zone. The force acting on the squeezer ball can then be adjusted in response to the instantaneous value of the width of the gap.

These and other objects, features, and advantages of the present invention will become apparent in light of the Detailed Description of the Invention.

BRIEF DESCRIPTION OF THE DRAWINGS

A detailed description of the invention will now be given by way of example and with reference to drawings, in which

FIG. 3 shows a similar section to FIG. 2 through a further embodiment of the invention; and FIG. 4 shows a similar section to FIG. 2 through a further embodiment of the invention.

DETAILED DESCRIPTION OF THE INVENTION

Figure 1:
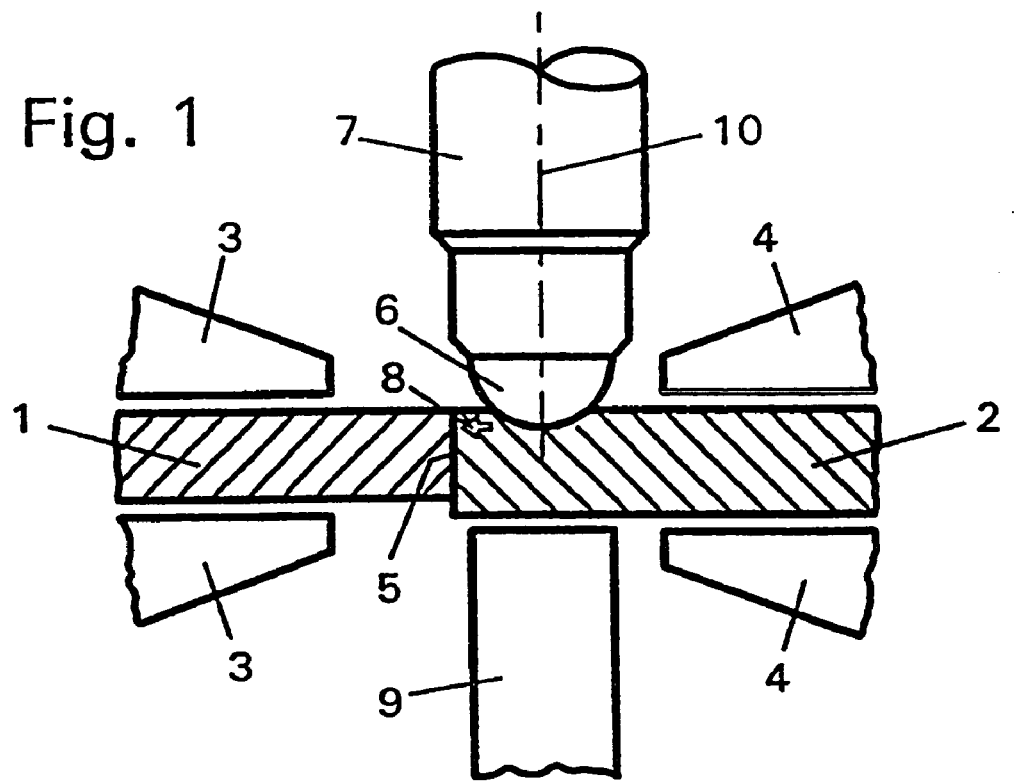
FIG. 1 shows a section through an arrangement according to the invention, made in the region of the welding zone, perpendicularly to two metal sheets of unequal thickness which are to be welded together.

FIG. 1 shows a section through an apparatus according to the invention, made perpendicularly to two metal sheets 1 and 2 to be joined together, one of which is thicker than the other. The two sheets 1 and 2 lie with their edges adjacent and are butt welded together in this position. Welding is performed, in a manner known in itself, by a laser beam which in the welding zone has a focused cross-section with a diameter of e.g. 0.2 mm. In order for the weld to be of the necessary quality and to be free from defects, the gap between the adjoining sheets 1 and 2 in the welding zone should not exceed a maximum of 0.08 mm. If the gap is wider than this, sagging of the weld or burn-through by the beam will occur.

The sheet 2 is plastically deformed, before and/or in the welding zone and as shown in FIG. 1, by means of a squeeze roller 6 mounted on a support 7, so that any gap present between the sheets 1 and 2 is reduced and/or so that the maximum permitted width of gap stated above is not exceeded. The support 7 is pressed perpendicularly against the sheet 2, causing the deformed material to flow mainly in the direction of the arrow 8.

During the squeezing operation, the sheet 2 is supported by a backing element 9 located opposite the squeeze roller 6 acting on the sheet 2. Holding devices 3 and 4 (also referred to as "workpiece holders") are also provided which fix the two sheets 1 and 2 at least during the squeezing operation and/or during the ensuing welding operation. Actual clamps are used as holding devices 3 and 4. The support 7 in FIG. 1 is shown with an axis 10 which refers to the rotationally symmetrical configuration of the support 7.

Figure 2:
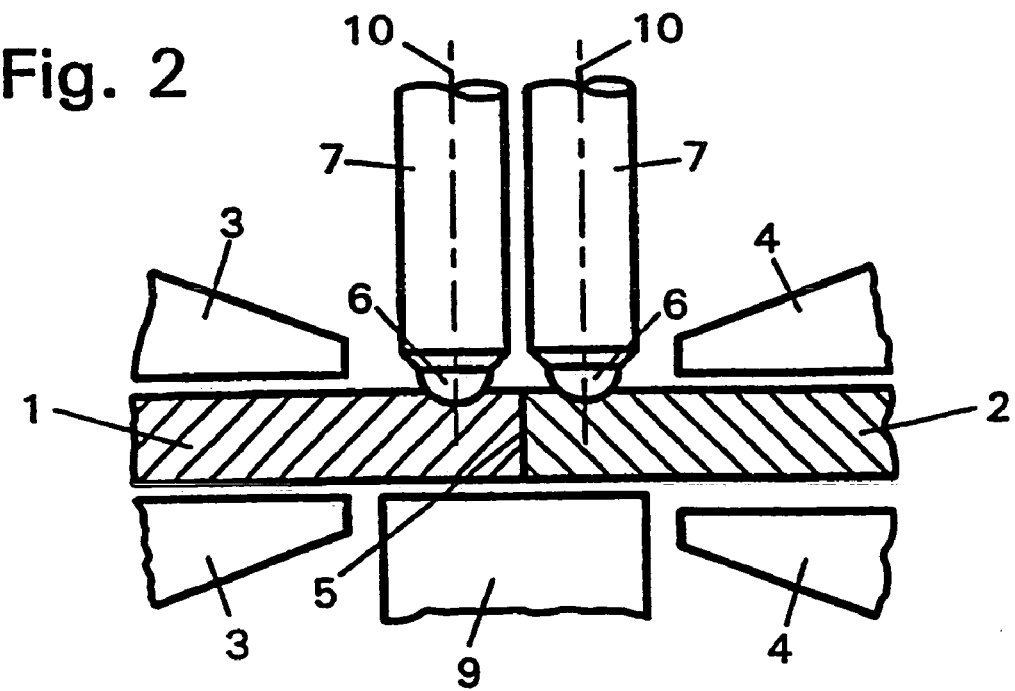
FIG. 2 shows a section through a further embodiment of the invention, made perpendicularly to two metal sheets of equal thickness which are to be welded together.

FIG. 2 shows a section through a further embodiment of the apparatus according to the invention. Here the metal sheets 1 and 2 for welding are of equal thickness. Instead of a single squeeze roller 6, two squeeze rollers 6 are used, each acting perpendicularly from above on one of the sheets 1 and 2. The special feature of this arrangement is that both sheets 1 and 2 are deformed, so that smaller deformations are necessary to achieve the same effect. In other words, this embodiment could be used to reduce relatively large gaps between welding sheets 1 and 2 to within the maximum permissible width.

A further embodiment which is shown in FIG. 3 differs from that of FIG. 2 in particular in that the axes 10 of the supports 7 include an acute angle with the plane of the metal sheets 1 and 2. Sufficient room is thereby left at the joint 5 for the actual width of the gap to be detected for example by means of a detection device 14, so that the pressure force acting on the support 7 can be adjusted accordingly by a control arrangement.

A further feature of the embodiment shown in FIG. 3 is that the backing element 9, which was in one piece in FIG. 2, is now shown divided in two. As a result, the underside of the joint 5 also becomes freely accessible, which again facilitates the determination of the width of the gap by means of the detection device 14.

FIG. 4 shows a preferred embodiment of the apparatus according to the invention, in which a support 7 for a squeeze roller 6 is angled obliquely with respect to the plane formed by the metal sheet 1. The angled arrangement allows deformation of the sheet 1 to take place as close as possible to the joint 5. The sheet 2 is pressed against the backing element 9, and thus fixed in position, by a fixing unit 12 (also referred to as a "brake") which has at its lower end a fixing shoe 13 coming into contact with the sheet 2. This prevents the sheet 2 from being pushed back laterally should excessive deformation of the sheet 1 occur.

It can also be seen from FIG. 4 that the fixing unit 12 is in the form of a bar and is set at an oblique angle with respect to a plane formed by the sheet 2. Hence the joint 5 is again easily accessible for auxiliary devices 15.

The backing element 9 of the embodiment shown in FIG. 4 is formed as a roller with a rotational axis 11. The roller extends across the joint 5 and therefore supports both sheets 1 and 2. It would also be feasible to provide separate backing elements 9 for the sheets 1 and 2 in a similar fashion to those of FIG. 3 but forming each backing element 9 as a roller with a rotational axis 11.

Although this invention has been shown and described with respect to the detailed embodiments thereof, it will be understood by those skilled in the art that various changes in form and detail thereof may be made without departing from the spirit and scope of the invention.

What is claimed is:

1. An apparatus for handling a pair of sheet metal workpieces to be welded, comprising:
    a first workpiece holder;
    a second workpiece holder;
    wherein the first and second workpiece holders are positioned so that an edge of one of the pair of sheet metal workpieces is in contact with, or separated by a gap from, an edge of the other sheet metal workpieces;
    a backing element disposed on a first side of the sheet metal workpieces; and
    a squeeze roller, disposed on a second side of the sheet metal workpieces opposite the first side and substantially aligned with the backing element, the squeeze roller being mounted on a support to permit rotation of the squeeze roller in any direction, wherein the squeeze roller is formed as a body symmetrical in rotation, and wherein force selectively applied to the squeeze roller will cause plastic deformation of one of the pair of sheet metal workpieces and thereby cause the deformed sheet metal workpiece to extend into the gap.

2. The apparatus of claim 1, further comprising a workpiece brake that can be selectively actuated into contact with one of the sheet metal workpieces and thereby cause the contacted sheet metal workpiece to be clamped between the backing element and the workpiece brake.

3. The apparatus of claim 2, wherein the workpiece brake is disposed at an acute angle relative to the contacted sheet metal workpiece.

4. A method for welding a pair of sheet metal workpieces with a butt joint, comprising the steps of:
    positioning the first and second workpieces so that an edge of one of the pair of sheet metal workpieces is substantially in contact with an edge of the other of the pair of sheet metal workpieces;
    plastically deforming at least one of the workpieces with a squeeze roller before or in a welding zone to reduce a width of any gap present between the first and second workpieces;
    guiding the squeeze roller along a joint of any desired curve form in a manner such that the plastic deformation produced is substantially dependent on the force acting on the squeeze roller and is substantially independent of the line of the joint; and
    welding the workpieces together at the joint with a laser.

5. The method of according to claim 4, wherein the at least one workpiece is plastically deformed in a region of the workpiece immediately adjacent to the edge of the workpiece.

6. A method for handling a pair of sheet metal workpieces to be welded, comprising the steps of:
    positioning the first and second workpieces so that an edge of one of the pair of sheet metal workpieces is substantially in contact with an edge of the other of the pair of sheet metal workpieces;
    plastically deforming at least one of the workpieces wit a squeeze roller along the edge that is substantially in contact with the other workpiece to reduce a width of any gap present between the first and second workpieces, wherein the plastic deformation occurs before or in a welding zone; and
    guiding the squeeze roller along the edge in a manner such that the plastic deformation produced is substantially dependent on the force acting on the squeeze roller and is substantially independent of the line of the joint.

* * * * *

UNITED STATES PATENT AND TRADEMARK OFFICE
CERTIFICATE OF CORRECTION

| | |
|---|---|
| PATENT NO. | : 7,034,247 B2 |
| APPLICATION NO. | : 10/674095 |
| DATED | : April 25, 2006 |
| INVENTOR(S) | : Wildmann et al. |

It is certified that error appears in the above-identified patent and that said Letters Patent is hereby corrected as shown below:

Column 4, Claim 6, line 56, please delete the word "wit" and replace with --with--.

Signed and Sealed this

Eighteenth Day of September, 2007

JON W. DUDAS
*Director of the United States Patent and Trademark Office*